(No Model.)

D. E. MYERS.
MECHANICAL MOVEMENT.

No. 280,757. Patented July 3, 1883.

WITNESSES.
Jacob W. Loeper
J. Carey Smith

INVENTOR.
David Elisha Myers

UNITED STATES PATENT OFFICE.

DAVID E. MYERS, OF INDIANAPOLIS, INDIANA.

MECHANICAL MOVEMENT.

SPECIFICATION forming part of Letters Patent No. 280,757, dated July 3, 1883.

Application filed April 5, 1883. (No model.)

*To all whom it may concern:*

Be it known that I, DAVID ELISHA MYERS, a citizen of the United States, residing at Indianapolis, in the county of Marion and State of Indiana, have invented a new and useful Device for Increasing Forces, of which the following is a specification.

My invention relates to improvements in power-increasing machines, in which a rotary triune shaft, in combination with lever, cog-wheels, and other shafts necessary to its construction, constitute the net-work of the machine.

The object of my invention is, first, a machine to increase the power of any desired motor and transmit the same to other objects, being constructed in such a manner that all resistance by weight or force will be systematically equalized throughout its bearings, and by a different process of leverage relieve the cog-wheels of the greater portion of force that would otherwise come upon them; also, to obviate the resistance of friction, which cannot be done in the construction of cog-wheels exclusive of a different system of leverage. I attain these objects by the mechanism illustrated in the accompanying drawings, in which—

Figure 1:
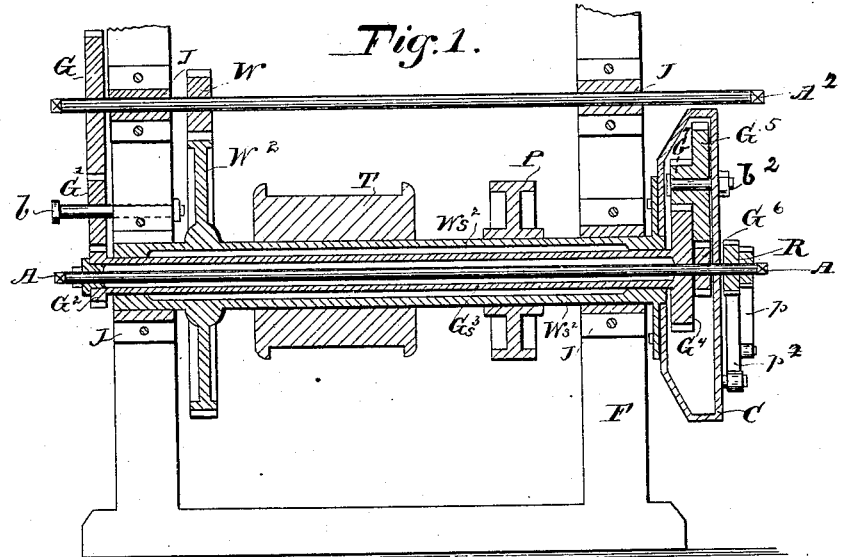
Figure 2:
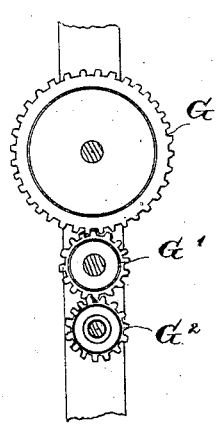
Figure 3:
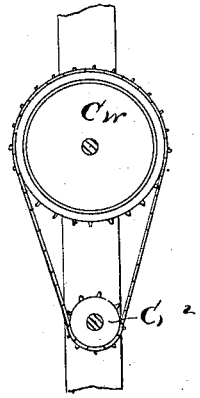
Figure 4:
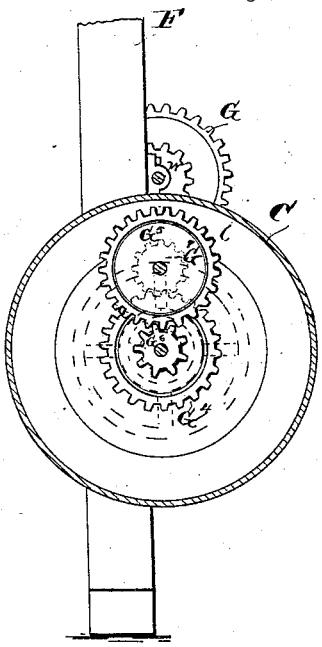

Figure 1 is a side view of my device. Fig. 4 is an end view of same with the outer flange or brace removed. Fig. 2 is a sectional end view of my device, and Fig. 3 is a modification of the same.

Similar letters refer to similar parts throughout the several views.

The frame J, as partly shown in Fig. 1, constructed of any desired material provided for shafting and attachable to any suitable base, constitutes the frame-work of the machine.

A rotary sectional triune shaft is designated by A, $Gs^3$, and $Ws^2$. A designates a driving-shaft with appliances to receive and communicate the power of any desired motor, and has its bearings and turns in $Gs^3$. The latter represents a tubular shaft with appliances to receive and distribute its forces, and has its bearings and turns in $Ws^2$, the same being a tubular shaft having appliances to receive forces and communicate the same to any purpose that may require such forces, and has its bearings and turns in frame J.

$A^2$ also designates a rotary driving-shaft, but of different magnitude to that of A. It also has appliances in communication with the sectional triune shaft, and has its bearings and turns in frame J.

C designates a lever with eccentric studs or pins $b^2$, which constitute the journal or bearing of gear $G^5 G^7$, and three of said studs or pins are required in a complete machine, having a shoulder and thread-nut on each end to secure the two flanges, or, in other words, the lever and a brace corresponding to it, together, as it were, in a solid piece. The lever consists of two round or triangular flanges, $G^6$, rigidly secured on driving-shaft A, engages with $G^5$, and by means of $G^7$ engages $G^4$, which is rigidly secured to $Gs^3$, the lever C being rigidly secured to $Ws^2$. The result of its operation is a division of forces between the lever C and gear $G^4$, causing the same to turn or rotate in opposite directions. (See Fig. 2.) Appertaining to the other end, $G^2$, rigidly secured to $Gs^3$, engages $G'$, which rotates on stud or pin $b$ or rigidly secured to a rotary shaft, either of which provided in a manner that said gear can be moved in and out of engagement when desired, said gear engaging with gear G, which is rigidly secured on a driving-shaft, $A^2$. Gear W, being rigidly secured on same shaft, engages $W^2$, which is rigidly secured on $Ws^2$, making a thorough connection by cog-wheel and lever of the machine constituting my invention.

R designates a ratchet with a double row of teeth, each averse to the other, or a single row, catching both ways, and is rigidly secured to the driving-shaft A, having corresponding pawls, double or apart, secured, but not rigidly, to the outer flange or brace of lever C, one of which is designed to secure safety while coiling a rope or cable, and the other to secure a lock in the sectional triune shaft for uncoiling the rope when desired.

P and T, secured on $Ws^2$, as shown in Fig. 1, have no special significance in the manner shown. T represents a drum for coiling a rope, or any other device for hoisting purposes.

P designates a pulley or any other device by which its forces may be communicated on or to other objects.

Fig. 3 of the drawings represents a chain-connection, and has the same relation in the machine that Fig. 2 has. It effects the same purpose, and its effects on the machine are precisely the same, although a greater degree of force on the same-sized machine may be had by its use than can be had by the use of the other. It consists of two chain-pulleys, provided for the purpose, and a chain endless in its construction, and embraces both pulleys, one of which occupies the position of gear G and the other the position of $G^2$, either of which can be provided with clutch or any ordinary means of engaging and disengaging when such conditions are required.

Figs. 2 and 3 of the drawings may be considered optional with the purchaser and manufacturer of the machine.

The mode of operation and effect: The sectional driving-shaft A, with the necessary appliances to receive the power of a steam-engine or any other desired motor, by means of the gear $G^6$, distributes its forces throughout the several sectional parts of the machine, and by reversing the gearing may concentrate its forces on any shaft in the machine, but, as a powerful increaser of forces, should be concentrated on $Ws^2$, which is intended to overcome the resistance of any weight or force to which it may be attached in a heavy weight to any considerable altitude. After being released of the same the gear $G'$ can be moved out of engagement, and the lock-pawl P placed in effect, turning in the same direction as before. The rope will uncoil at the same time. $Ws^2$ will be equal in speed to driving-shaft A. While in said condition the motive power may be applied to driving-shaft $A^2$, by which means an ordinary convenient power is attainable; and, still further, while in said condition, the drum may be used as an ordinary windlass, as though there were no gear attached.

What I claim as my invention, and desire to secure by Letters Patent, is—

1. The improved machine for increasing power and transmitting the same, consisting of a sectional triune rotary shaft, A, $Gs^3$, and $Ws^2$, in combination with lever C, stud $b^2$, gears $G^6$, $G^5$, $G^7$, and $G^4$, or their equivalents as shown in Fig. 3, the whole constructed and combined substantially as specified.

2. In the improved power-increasing machine, gears $G^2$, $G'$, G, W, and $W^2$, in combination with shaft $A^2$ and stud $b$, communicating with ratchet and pawl P and other parts of the machine, constructed and combined substantially as specified.

In testimony that I claim the above I have hereunto subscribed my name in the presence of two witnesses.

DAVID E. MYERS.

Witnesses:
 CHARLES K. WASSON,
 LYNN B. MARTINDALE.